(12) United States Patent
Kawakubo (10) Patent No.: US 8,644,004 B2
(45) Date of Patent: *Feb. 4, 2014

(54) ELECTROLYTIC CAPACITOR AND METHOD OF MANUFACTURING THE SAME

(75) Inventor: Tetsuya Kawakubo, Takeo (JP)

(73) Assignees: SANYO Electric Co., Ltd., Moriguchi-shi, Osaka (JP); SAGA Sanyo Industries Co., Ltd., Saga (JP)

( * ) Notice: Subject to any disclaimer, the term of this patent is extended or adjusted under 35 U.S.C. 154(b) by 289 days.

This patent is subject to a terminal disclaimer.

(21) Appl. No.: 13/045,259

(22) Filed: Mar. 10, 2011

(65) Prior Publication Data

US 2011/0222208 A1    Sep. 15, 2011

(30) Foreign Application Priority Data

Mar. 11, 2010   (JP) ................................. 2010-054322

(51) Int. Cl.
*H01G 4/228*  (2006.01)
*H01G 9/10*   (2006.01)

(52) U.S. Cl.
USPC ........................... 361/520; 29/25.03; 361/511

(58) Field of Classification Search
USPC .......... 29/25.03; 361/511, 515, 520, 530, 538
See application file for complete search history.

(56) References Cited

U.S. PATENT DOCUMENTS

| | | | | |
|---|---|---|---|---|
| 3,988,650 A | * | 10/1976 | Fritze | 361/511 |
| 6,307,733 B1 | * | 10/2001 | Maruyama et al. | 361/511 |
| 7,663,864 B2 | * | 2/2010 | Fujimoto et al. | 361/511 |
| 8,206,466 B2 | * | 6/2012 | Kawakubo et al. | 29/25.03 |
| 8,243,421 B2 | * | 8/2012 | Fujimoto | 361/511 |
| 8,320,104 B2 | * | 11/2012 | Fujimoto | 361/511 |
| 8,320,105 B2 | * | 11/2012 | Fujimoto | 361/512 |
| 2009/0195965 A1 | * | 8/2009 | Fujimoto | 361/511 |
| 2010/0073850 A1 | * | 3/2010 | Fujimoto | 361/530 |

FOREIGN PATENT DOCUMENTS

| | | | |
|---|---|---|---|
| JP | 04062912 A | * | 2/1992 |
| JP | 05061107 A | * | 3/1993 |
| JP | 2004-179621 A | | 6/2004 |

* cited by examiner

*Primary Examiner* — Eric Thomas
(74) *Attorney, Agent, or Firm* — Westerman, Hattori, Daniels & Adrian, LLP (57) ABSTRACT

A first cathode lead terminal is arranged closer to one end of a cathode foil than a second cathode lead terminal, and a first anode lead terminal is arranged closer to one end of an anode foil than a second anode lead terminal. In a cross-section perpendicular to an axis, a core has a first length along a first straight line passing through the axis and a second length along a second straight line passing through the axis and orthogonal to the first straight line, and the first length is smaller than the second length. When the cathode and the anode foils are together wound around the core from each one end, the first straight line lies between the first cathode lead terminal and the first anode lead terminal and the second straight line lies between the second cathode lead terminal and the second anode lead terminal.

5 Claims, 13 Drawing Sheets

ELECTROLYTIC CAPACITOR AND METHOD OF MANUFACTURING THE SAME

This nonprovisional application is based on Japanese Patent Application No. 2010-054322 filed with the Japan Patent Office on Mar. 11, 2010, the entire contents of which are hereby incorporated by reference.

BACKGROUND OF THE INVENTION

1. Field of the Invention

The present invention relates to an electrolytic capacitor and a method of manufacturing the same.

2. Description of the Related Art

An electrolytic capacitor having an anode foil and a cathode foil wound together around an axis and an electrode lead attached to each of them has widely been used. For example, Japanese Patent Laying-Open No. 2004-179621 discloses an electrolytic capacitor having two cathode lead terminals and two anode lead terminals, that is, four lead terminals in total. A plurality of cathode lead terminals and anode lead terminals are provided, in order to lower equivalent series inductance (ESL) and equivalent series resistance (ESR).

Unbalanced arrangement of the four lead terminals above may cause a problem in a process for manufacturing a capacitor or a process for mounting a capacitor. This problem is represented, for example, by concentration of stress on some terminals, lowering in hermeticity in sealing, or tilting of a capacitor with respect to a mount surface. In order to avoid this problem, the four lead terminals above are desirably arranged as symmetric as possible with respect to an axis of winding above. Specifically, in a two-dimensional layout, the four lead terminals are desirably arranged in a manner substantially corresponding to four respective vertices of a square having the axis of winding above in the center. In order to achieve such arrangement, a distance between each of the four lead terminals and the axis should substantially be equal.

As winding proceeds, however, the distance between each foil and the axis increases, and hence difference is produced in the distance between each of the two lead terminals arranged at different positions in each foil and the axis. Therefore, it has been difficult to arrange four lead terminals in a manner substantially corresponding to four respective vertices of a square having the axis in the center.

SUMMARY OF THE INVENTION

A method of manufacturing an electrolytic capacitor according to the present invention has the following steps. A cathode foil having one end is prepared. First and second cathode lead terminals are attached to the cathode foil. In attachment, the first cathode lead terminal is arranged closer to one end of the cathode foil than the second cathode lead terminal. An anode foil having one end is prepared. First and second anode lead terminals are attached to the anode foil. In attachment, the first anode lead terminal is arranged closer to one end of the anode foil than the second anode lead terminal. A core having an axis is prepared. In a cross-section perpendicular to the axis, the core has a first length along a first straight line which passes through the axis and a second length along a second straight line which passes through the axis and is orthogonal to the first straight line, and the first length is smaller than the second length. The cathode foil and the anode foil are together wound around the core from one end of each of the cathode foil and the anode foil. This winding is performed such that, in the cross-section above, the first straight line lies between the first cathode lead terminal and the first anode lead terminal and the second straight line lies between the second cathode lead terminal and the second anode lead terminal.

An electrolytic capacitor according to the present invention includes a capacitor element, first and second cathode lead terminals, and first and second anode lead terminals. The capacitor element includes a cathode foil and an anode foil each of which has one end. The cathode foil and the anode foil are wound together around an axis from one end of each of the cathode foil and the anode foil. In a cross-section perpendicular to the axis, the capacitor element has a first length along a first straight line which passes through the axis and a second length along a second straight line which passes through the axis and is orthogonal to the first straight line, and the first length is smaller than the second length. First and second cathode lead terminals are attached to the cathode foil. First and second anode lead terminals are attached to the anode foil. The first cathode lead terminal is arranged closer to one end of the cathode foil than the second cathode lead terminal in a direction of extension of the cathode foil. The first anode lead terminal is arranged closer to one end of the anode foil than the second anode lead terminal in a direction of extension of the anode foil. The first straight line lies between the first cathode lead terminal and the first anode lead terminal. The second straight line lies between the second cathode lead terminal and the second anode lead terminal.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described hereinafter with reference to the drawings.

First Embodiment

Figure 1:
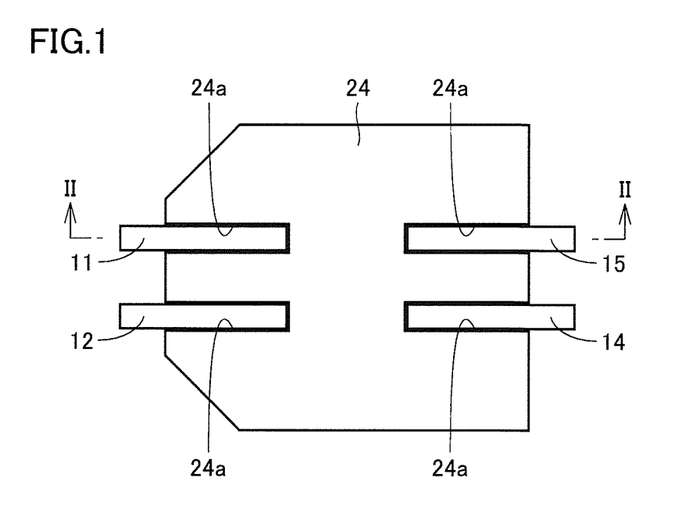
FIG. 1 is a plan view schematically showing a construction of an electrolytic capacitor in a first embodiment of the present invention.
Figure 2:
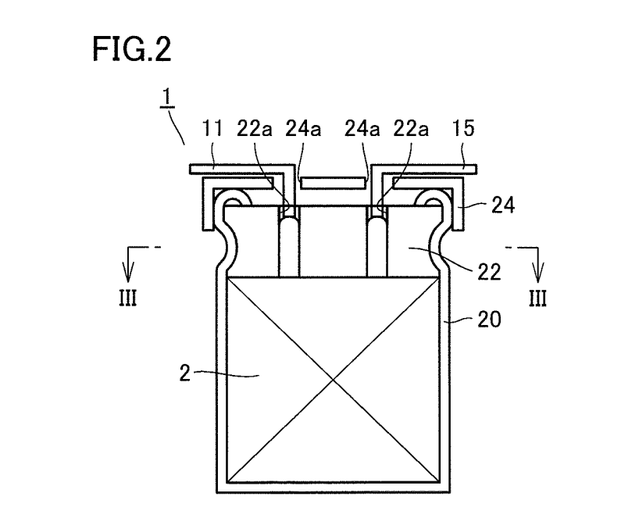
FIG. 2 is a schematic cross-sectional view along the line II-II in FIG. 1.
Figure 5:
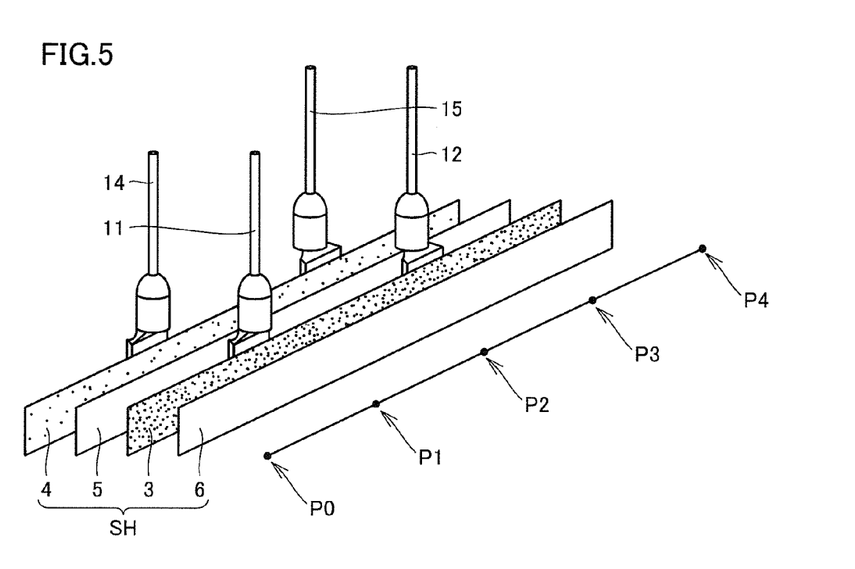

Referring mainly to FIGS. 1 and 2, a solid electrolytic capacitor (electrolytic capacitor) 1 in the present embodiment has a capacitor element 2, first and second cathode lead tab terminals (cathode lead terminals) 14 and 15, first and second anode lead tab terminals (anode lead terminals) 11 and 12, a seat plate 24, an aluminum case 20, and a sealing rubber gasket 22. Capacitor element 2 includes a cathode foil 4 and an anode foil 3 each having one end (the vicinity of a position P0 in FIG. 5). Cathode foil 4 and anode foil 3 are wound together around an axis AX (FIG. 9) from one end of each of cathode foil 4 and anode foil 3. It is noted that axis AX herein is virtual and it does not indicate some kind of a member. As shown in FIG. 5, first and second cathode lead terminals 14 and 15 are attached to cathode foil 4, and first and second anode lead tab terminals 11 and 12 are attached to anode foil 3. First cathode lead tab terminal 14 is arranged closer to one end of cathode foil 4 (the vicinity of position P0 in FIG. 5 or a position of start of winding in FIG. 9) than second cathode lead terminal 15 in a direction of extension of cathode foil 4 (a direction along a straight line in FIG. 5 or a direction along a spiral in FIG. 9). First anode lead tab terminal 11 is arranged closer to one end of anode foil 3 (the vicinity of position P0 in FIG. 5 or the position of start of winding in FIG. 9) than second anode lead terminal 12 in a direction of extension of anode foil 3 (the direction along the straight line in FIG. 5 or the direction along the spiral in FIG. 9).

Figure 3:
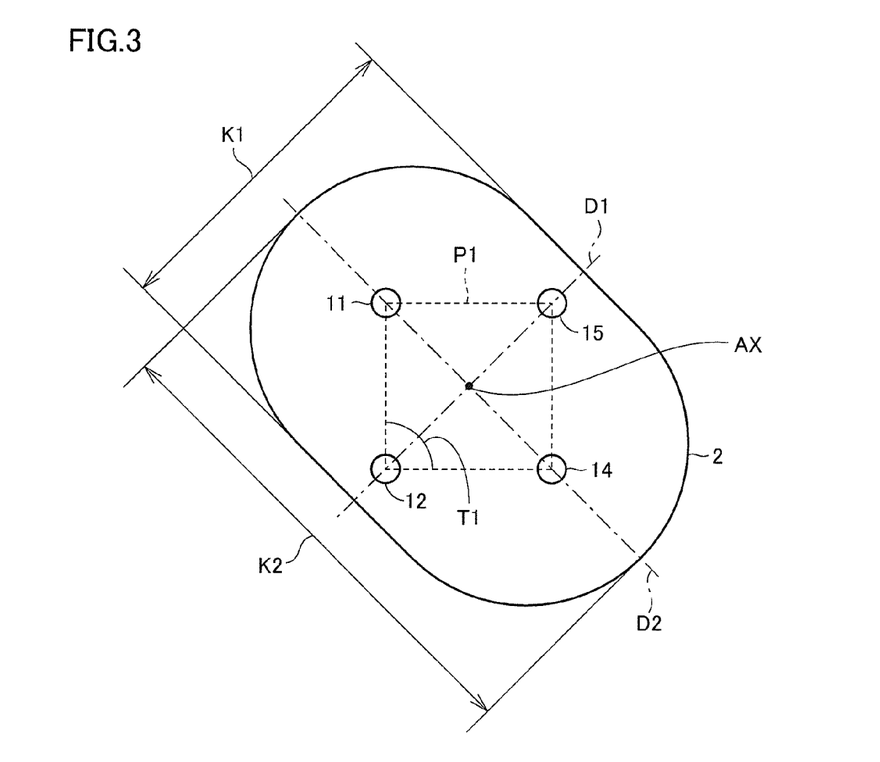
FIG. 3 is a diagram schematically showing a capacitor element and arrangement of an electrode lead terminal, along the line III-III in FIG. 2.

Referring mainly to FIG. 3, in a cross-section perpendicular to axis AX, an outer perimeter of capacitor element 2 has a first length K1 along a first straight line D1 passing through axis AX and a second length K2 along a second straight line D2 passing through axis AX and orthogonal to first straight line D1. First length K1 is smaller than second length K2. Specifically, the outer perimeter of capacitor element 2 is not in a circular shape but for example in a racetrack shape. First straight line D1 lies between first cathode lead tab terminal 14 and first anode lead tab terminal 11. Second straight line D2 lies between second cathode lead tab terminal 15 and second anode lead tab terminal 12.

Terminals 11, 12, 14, and 15 are attached to capacitor element 2 at positions corresponding to four respective vertices of a quadrangle P1. This quadrangle P1 is substantially a square having axis AX in the center, and hence an angle T1 (FIG. 3) has an angle of approximately 90° and specifically an angle, for example, within 90°±20°.

A method of manufacturing solid electrolytic capacitor 1 in the present embodiment will now be described.

Figure 4:
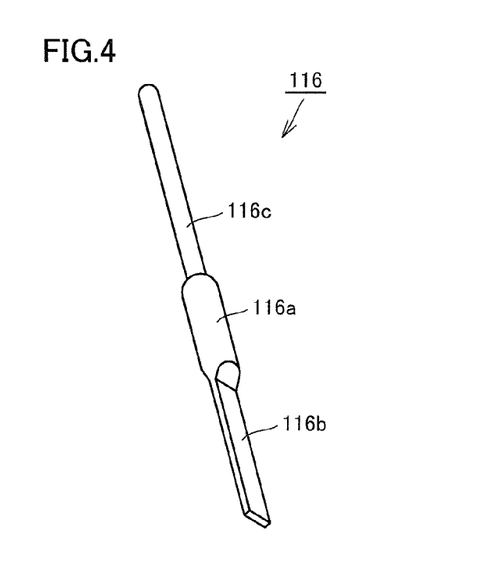
FIGS. 4 to 6 are perspective views schematically showing first to third steps in a method of manufacturing an electrolytic capacitor in the first embodiment of the present invention, respectively.

Referring mainly to FIG. 4, a terminal 116 is prepared as each of lead tab terminals 11, 12, 14, and 15 above (FIGS. 1 and 2). Terminal 116 has a boss portion 116a, a connection portion 116b, and a lead portion 116c.

Referring further to FIG. 5, anode foil 3, cathode foil 4, and sheets of separator paper 5 and 6 are prepared. Each of anode foil 3 and cathode foil 4 has one end (the vicinity of position P0 in the drawing).

First and second anode lead tab terminals 11 and 12 are attached in the vicinity of a position P1 and a position P3 in the direction of extension of anode foil 3, respectively (the direction of the straight line in the drawing). Position P1 is closer to position P0 than position P3. Specifically, connection portion 116b (FIG. 4) of each of first and second anode lead tab terminals 11 and 12 is connected to anode foil 3. Preferably, a position P2 in the center of anode foil 3 extending from position P0 to a position P4 is located between position P1 and position P3. More preferably, an interval between adjacent points among positions P0 to P4 is substantially equal. In this case, a distance between position P1 and position P3 corresponds to about half a length of anode foil 3.

In addition, first and second cathode lead tab terminals 14 and 15 are attached in the vicinity of position P1 and position P3 in the direction of extension of cathode foil 4, respectively (the direction of the straight line in the drawing). Position P1 is closer to position P0 than position P3. Specifically, connection portion 116b (FIG. 4) of each of first and second cathode lead tab terminals 14 and 15 is connected to cathode foil 4. Preferably, position P2 in the center of cathode foil 4 extending from position P0 to position P4 is located between position P1 and position P3. More preferably, an interval between adjacent points among positions P0 to P4 is substantially equal. In this case, a distance between position P1 and position P3 corresponds to about half a length of cathode foil 4.

It is noted that an attachment position of each of first and second anode lead tab terminals 11 and 12 and first and second cathode lead tab terminals 14 and 15 is finely adjusted such that each terminal is arranged as shown in FIG. 3 when anode foil 3 and cathode foil 4 are wound as will be described later.

Then, anode foil 3 and cathode foil 4 are layered with separator paper 5 being interposed. In addition, separator paper 6 is layered on anode foil 3. Namely, a stack sheet SH having anode foil 3, cathode foil 4 and sheets of separator paper 5 and 6 is prepared. It is noted that this layering may be performed simultaneously with winding which will be described later.

Figure 6:
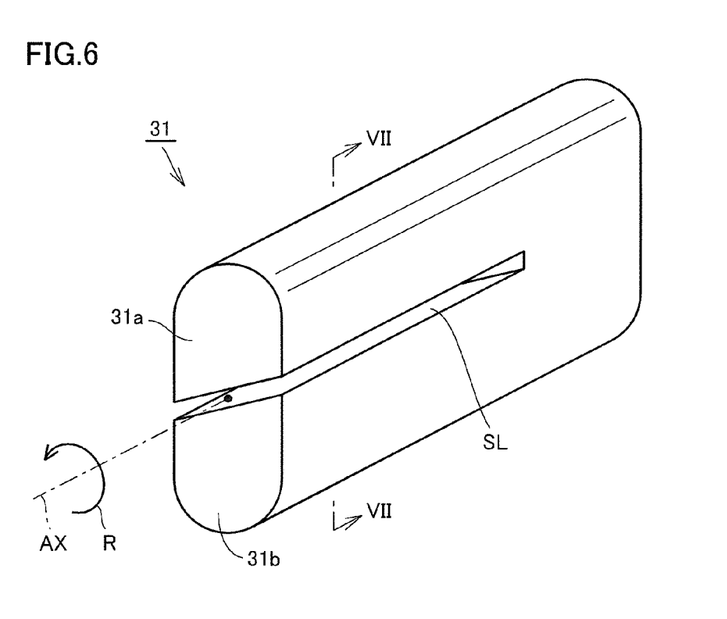

Referring to FIG. 6, a core 31 having axis AX is prepared. A one end portion of core 31 on axis AX (an end portion in lower left in the drawing) is divided into first and second portions 31a and 31b by a slit SL.

Figure 7:
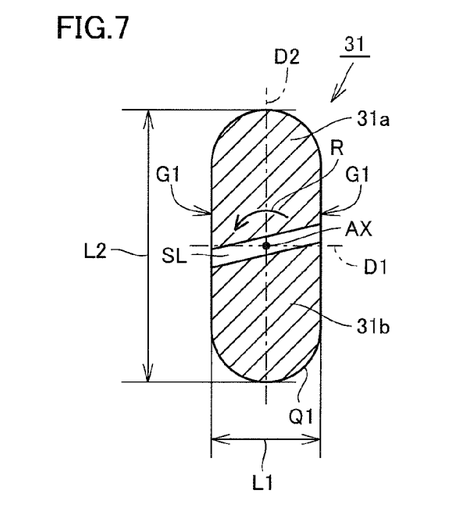
FIG. 7 is a schematic cross-sectional view along the line VII-VII in FIG. 6.

Referring to FIG. 7, in the cross-section perpendicular to axis AX, core 31 has a first length L1 along first straight line D1 passing through axis AX and a second length L2 along second straight line D2 passing through axis AX and orthogonal to first straight line D1. First length L1 is smaller than second length L2. Specifically, a cross-section (FIG. 7) of core 31 has an outer perimeter in a racetrack shape Q1. It is noted that racetrack shape Q1 herein is a shape defined regardless of presence of slit SL.

More specifically, the cross-section of core 31 has a pair of straight line portions G1 (first straight line portion) opposed to each other along first straight line D1 and extending in parallel to second straight line D2. In addition, the cross-section of core 31 has a pair of curve portions (first curve portion) opposed to each other along second straight line D2 and being convex outward. Each curve portion is, for example, a part of a circle or an ellipse.

Figure 8:
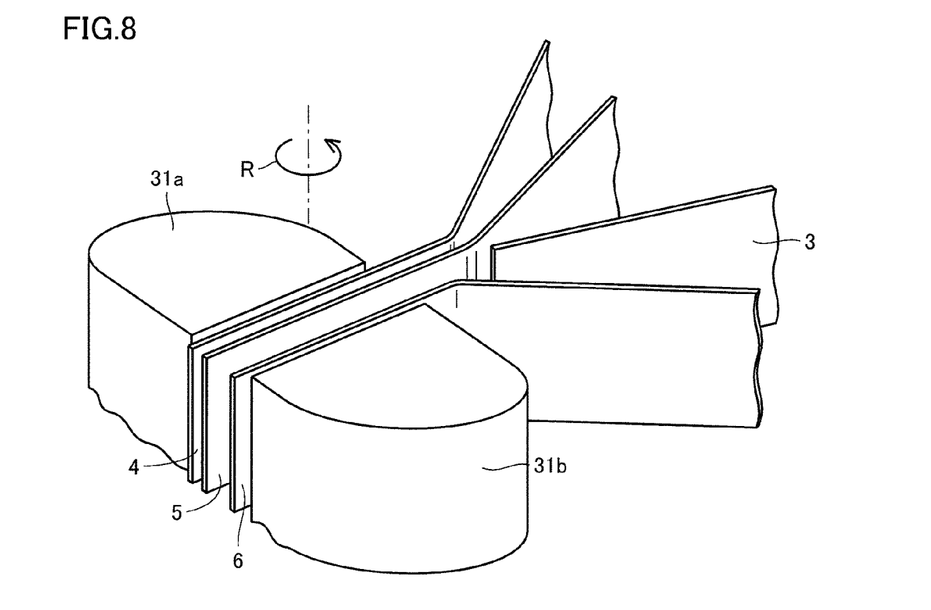
FIG. 8 is a perspective view schematically showing a fourth step in the method of manufacturing an electrolytic capacitor in the first embodiment of the present invention.

Referring mainly to FIG. 8, one end (FIG. 5: the vicinity of position P0) of each of anode foil 3, cathode foil 4 and sheets of separator paper 5 and 6 lies in slit SL. Then, core 31 is turned around axis AX as shown with an arrow R in FIGS. 6 to 8. Thus, separator paper 6, anode foil 3, separator paper 5, and cathode foil 4 start to be wound around core 31 as they are layered.

Figure 9:
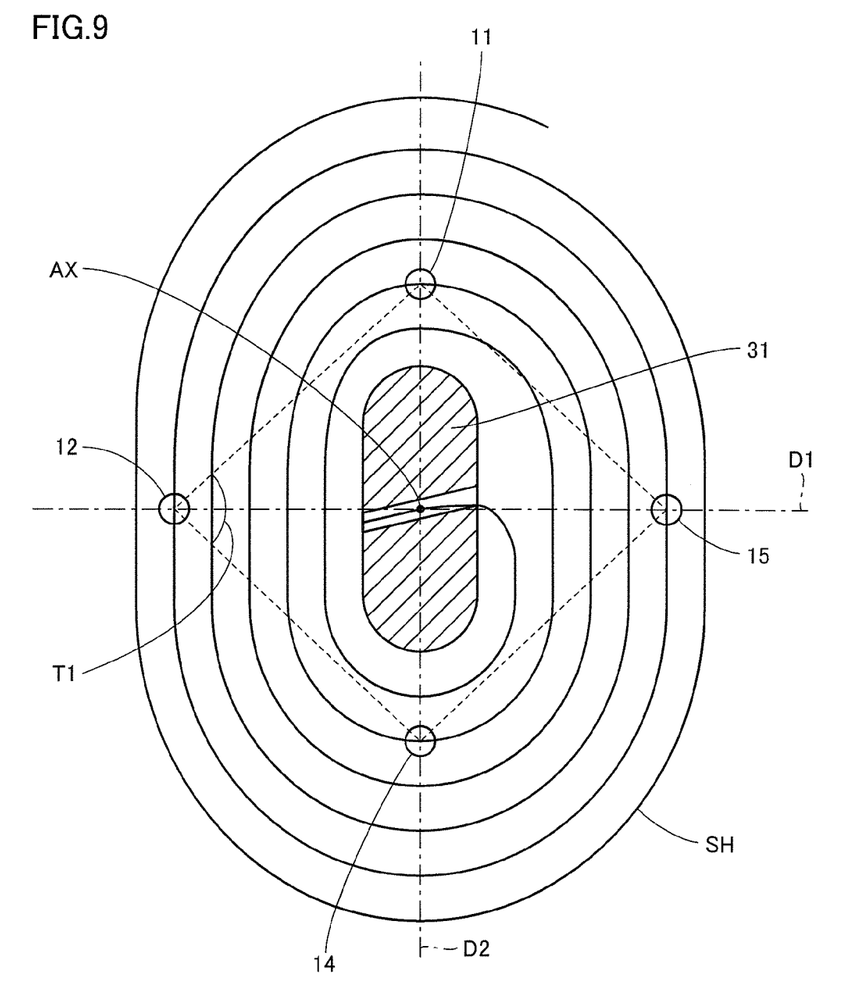
FIG. 9 is a cross-sectional view schematically showing a fifth step in the method of manufacturing an electrolytic capacitor in the first embodiment of the present invention.

Referring mainly to FIG. 9, stack sheet SH (FIG. 5: anode foil 3, cathode foil 4, and sheets of separator paper 5 and 6) is wound around core 31. Namely, cathode foil 4 and anode foil 3 are together wound around core 31 from one end of each of cathode foil 4 and anode foil 3. This winding is performed such that, when viewed in cross-section, first straight line D1 lies between first cathode lead tab terminal 14 and first anode lead tab terminal 11 and second straight line D2 lies between second cathode lead tab terminal 15 and second anode lead tab terminal 12. In order to arrange each terminal as such, a position of attachment of each terminal (FIG. 5) should only finely be adjusted.

Figure 10:
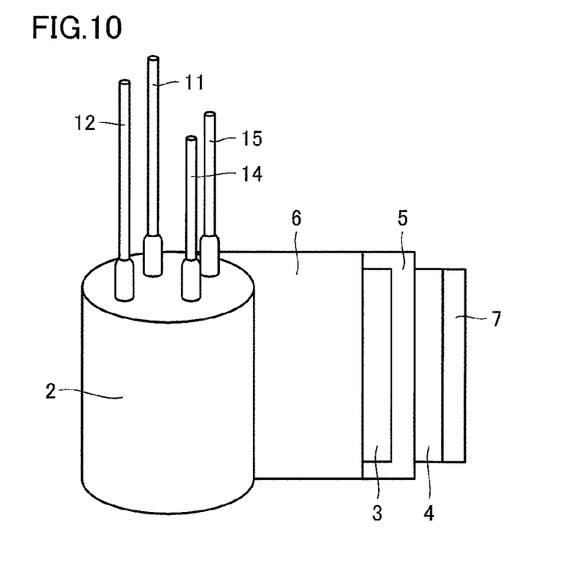
FIGS. 10 to 12 are perspective views schematically showing sixth to eighth steps in the method of manufacturing an electrolytic capacitor in the first embodiment of the present invention, respectively.

Referring further to FIG. 10, after winding above is completed, the other end of cathode foil 4 (FIG. 5: the vicinity of position P4) is fixed by a tape 7. Then, wound stack sheet SH is separated from core 31. Capacitor element 2 before various treatments below is thus obtained.

Then, a cut surface or the like of the anode foil or the like of capacitor element 2 is subjected to chemical conversion treatment and further to heat treatment at a temperature approximately from 150° C. to 300° C. Then, capacitor element 2 is impregnated with a solution mixture of a monomer forming a conductive polymer through polymerization, such as 3,4-ethylenedioxythiophene, and for example a ferric p-toluenesulfonate alcohol solution representing an oxidizing agent solution. Thereafter, through thermochemical polymerization, a conductive polymer layer (not shown) is formed between electrodes of capacitor element 2. Other than these materials, a conductive polymer material such as polypyrrole, polyfuran or polyaniline, or TCNQ complex salt (7,7,8,8-tetracyanoquinodimethane) may be used as an electrolyte.

Figure 11:
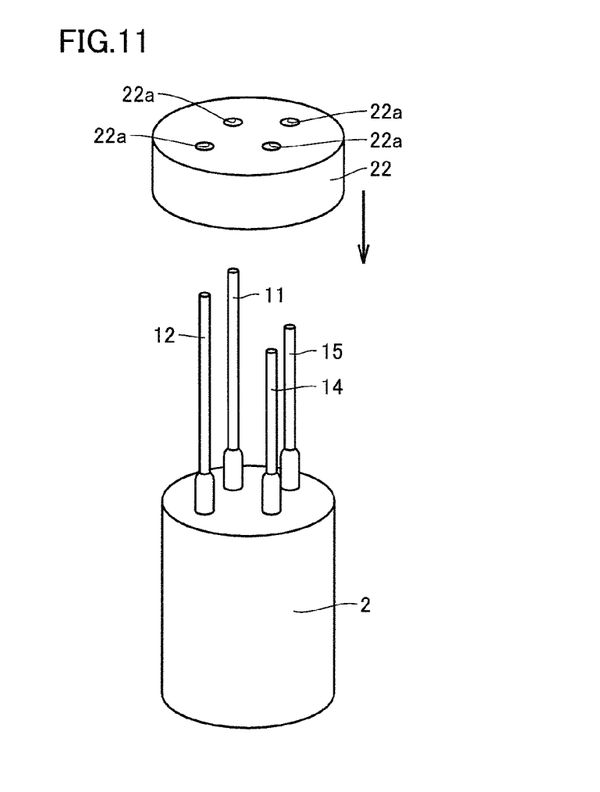

Referring to FIG. 11, sealing rubber gasket 22 is prepared. In sealing rubber gasket 22, an opening 22a is formed at a position corresponding to each of first and second anode lead tab terminals 11 and 12 and first and second cathode lead tab terminals 14 and 15. Then, as shown with an arrow in the drawing, first and second anode lead tab terminals 11 and 12 and first and second cathode lead tab terminals 14 and 15 are inserted in four respective openings 22a in sealing rubber gasket 22 in capacitor element 2.

Figure 12:
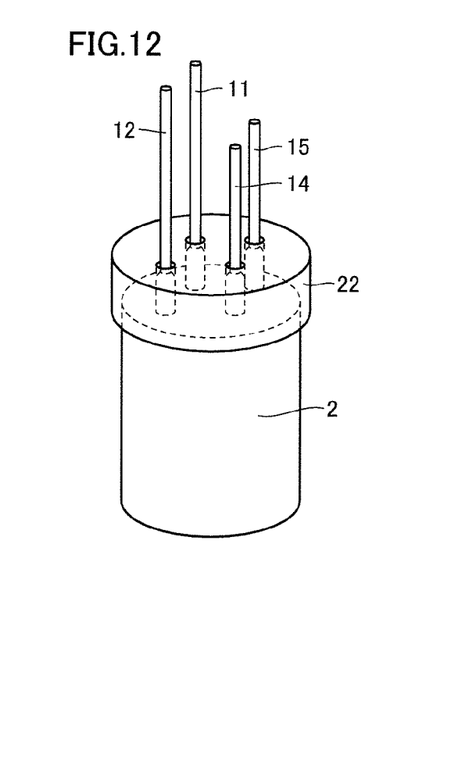

Referring to FIG. 12, capacitor element 2 to which sealing rubber gasket 22 has thus been attached is formed.

Referring mainly to FIGS. 1 and 2, capacitor element 2 to which sealing rubber gasket 22 is attached is accommodated in aluminum case 20 with a bottom having a prescribed size. Then, an open-end side of aluminum case 20 is sealed by pressing in a lateral direction and curling and prescribed aging treatment is performed.

Then, seat plate 24 made of plastic is attached to a curled surface of aluminum case 20. Four openings 24a corresponding to respective positions of lead tab terminals 11, 12, 14, 15 are formed in seat plate 24. In addition, seat plate 24 is attached to capacitor element 2 by inserting lead portion 116c (FIG. 4) of each of lead tab terminals 11, 12, 14, 15 in corresponding opening 24a. Then, each lead portion 116c (FIG. 4) protruding through opening 24a in seat plate 24 is pressed and bent, to thereby complete electrolytic capacitor 1 having a four-terminal structure.

A method of manufacturing an electrolytic capacitor in a Comparative Example will now be described.

Figure 13:
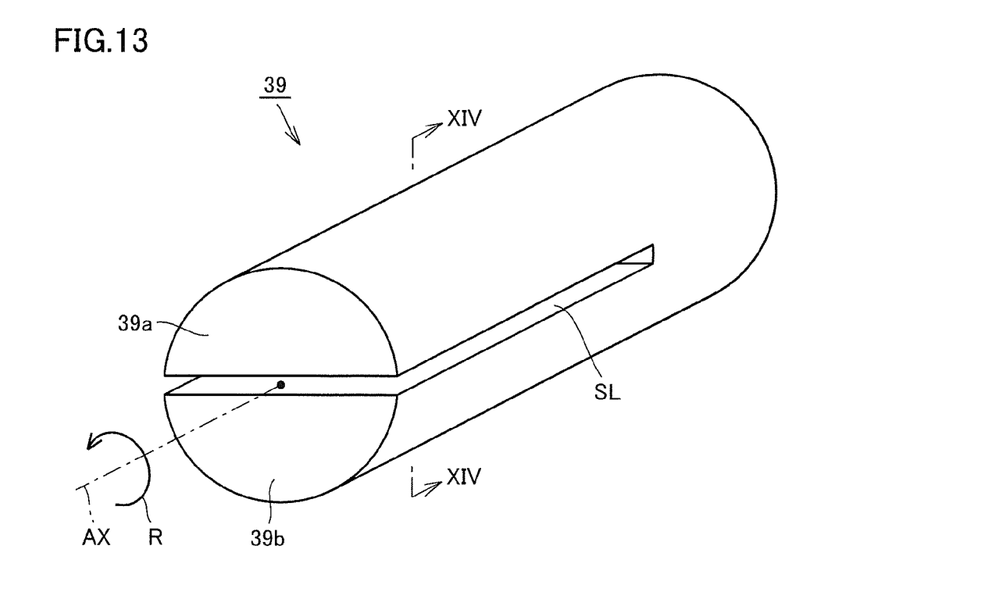
FIG. 13 is a perspective view showing a core of an electrolytic capacitor in a Comparative Example.
Figure 14:
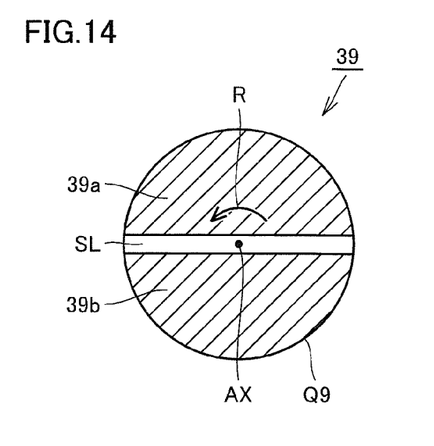
FIG. 14 is a cross-sectional view along the line XIV-XIV in FIG. 13.
Figure 15:
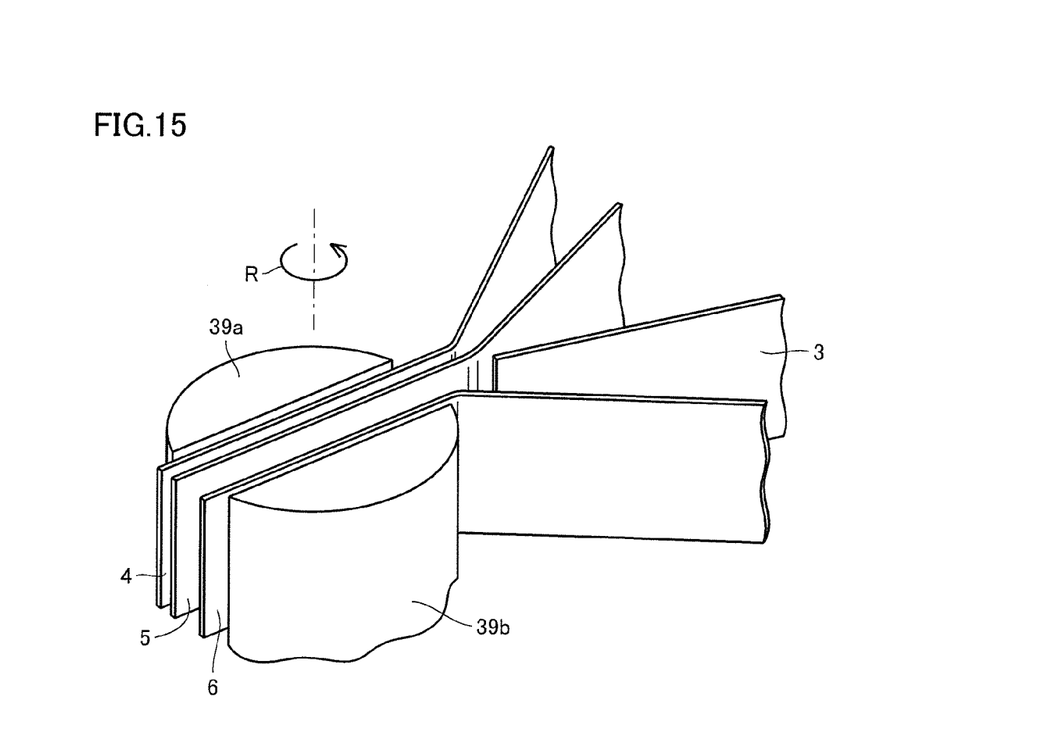
FIG. 15 is a perspective view schematically showing a first step in a method of manufacturing an electrolytic capacitor in Comparative Example.
Figure 16:
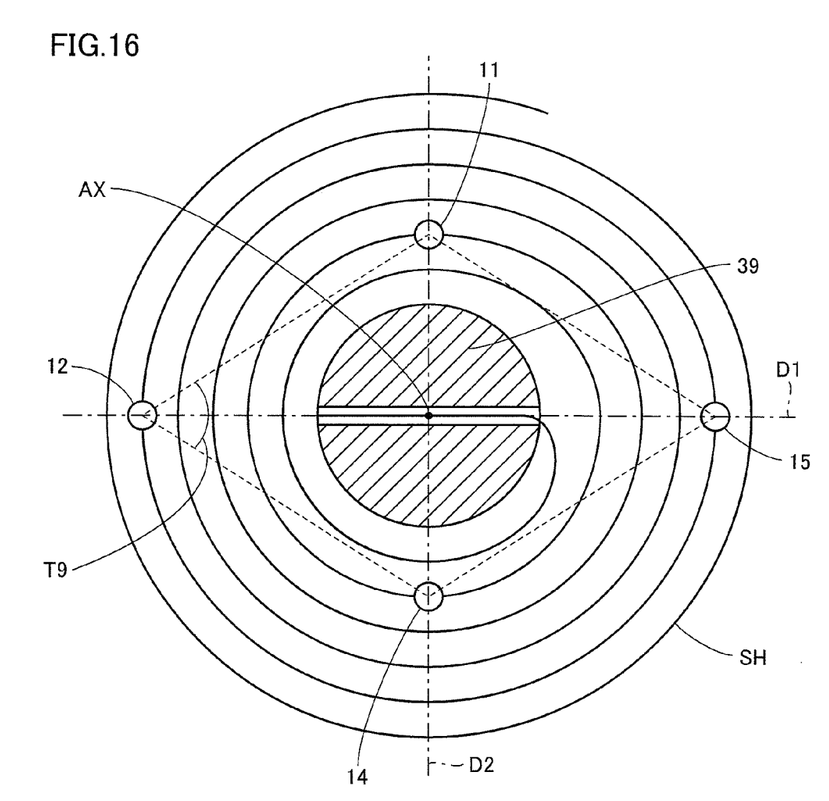
FIG. 16 is a cross-sectional view schematically showing a second step in the method of manufacturing an electrolytic capacitor in Comparative Example.

In the present Comparative Example, instead of core 31 (FIGS. 6 and 7), a core 39 (FIGS. 13 and 14) is employed to wind up (FIG. 15) stack sheet SH (FIG. 5). A cross-section of core 39 has an outer perimeter in a circular shape Q9 (FIG. 14). Therefore, as shown in FIG. 16, a distance between stack sheet SH and axis AX monotonously increases as winding proceeds. Consequently, a distance between each of second cathode lead tab terminal 15 and second anode lead tab terminal 12 and axis AX becomes significantly greater than a distance between each of first cathode lead tab terminal 14 and first anode lead tab terminal 11 and axis AX. Consequently, since an angle T9 (FIG. 16) becomes significantly smaller than 90°, a quadrangle having four terminals at respective vertices is considerably different from a square. Therefore, it is difficult to arrange four terminals in a manner substantially corresponding to four respective vertices of a square having axis AX in the center.

In contrast, according to the method of manufacturing electrolytic capacitor 1 in the present embodiment, in the cross-section perpendicular to axis AX (FIG. 7), core 31 has first length L1 along first straight line D1 passing through axis AX and second length L2 along second straight line D2 passing through axis AX and orthogonal to first straight line D1, and first length L1 is smaller than second length L2. As first length L1 is thus made smaller, increase in distance between stack sheet SH (each foil) and axis AX caused by winding can be compensated for in a direction along first straight line D1 as shown in FIG. 9. Therefore, difference in distance between each of first and second cathode lead tab terminals 14 and 15 arranged at different positions in stack sheet SH and axis AX can be suppressed, and similarly difference in distance between each of first and second anode lead tab terminals 11 and 12 and axis AX can be suppressed. Thus, difference in distance between each of the four terminals above and axis AX can be suppressed. Therefore, as shown in FIG. 3, the four terminals can be arranged in a manner substantially corresponding to four respective vertices of a square having axis AX in the center. Namely, the four terminals can be arranged in good balance.

When the four terminals can thus be arranged in good balance, for example, concentration of stress on some terminals and lowering in hermeticity in sealing can be prevented. In particular, in a case where capacitor element 2 is sealed by curling aluminum case 20 (FIG. 2), force applied to each terminal through sealing rubber gasket 22 is desirably as even as possible, in consideration of stress applied to a root of each terminal and hermeticity in sealing. To that end, as described above, the four arranged terminals desirably correspond to respective vertices of a square as much as possible. In addition, in a case where electrolytic capacitor 1 is a chip product, that is, a product in which each terminal is bent along seat plate 24 as shown in FIGS. 1 and 2, concentration of stress on some terminals at the time of bending can be prevented.

Further, when electrolytic capacitor 1 is soldered with a reflow method, tilting of a capacitor with respect to a mount surface can be prevented.

Dimensions in one example of the present embodiment are as follows. Anode foil 3 has a thickness of 110 μm and a length of 130 mm. Cathode foil 4 has a thickness of 30 μm and a length of 150 mm. Each of sheets of separator paper 5 and 6 has a thickness of 30 μm and a length of 160 mm. A cross-section of core 31 has length L1=1.0 mm and length L2=1.8 mm, and the curve portion of racetrack shape Q1 has a radius of curvature of 0.9 mm. In addition, the cross-section of capacitor element 2 has length K1=6.5 mm and length K2=7.2 mm.

A result of verification of functions and effects of the present embodiment will now be described. Under the dimension conditions above, 300 electrolytic capacitors 1 were manufactured as Example of the present embodiment. Consequently, angle T1 (FIG. 3) of all samples was within the range of 90°±20°. In contrast, in a case representing Comparative Example where circular core 39 (FIGS. 13 to 15) was employed, in 15 samples of 300 samples, angle T1 (FIG. 3) was not within the range of 90°±20°. Namely, probability that four terminals are arranged in a manner substantially corresponding to four respective vertices of a square was higher in Example than Comparative Example.

It is noted that a pair of straight line portions (second straight line portion) opposed to each other along second straight line D2 and extending in parallel to first straight line D1 may be provided instead of straight line portion G1 (FIG. 7) in the present embodiment. In this case, a pair of curve portions (second curve portion) opposed to each other along first straight line D1 and being convex outward may be provided.

Second Embodiment

In the first embodiment, core 31 (FIGS. 6 and 7) having a cross-section substantially in racetrack shape Q1 was employed. In the present embodiment, unlike core 31, a core having a cross-section in a substantially rectangular shape is employed. Except for this point, electrolytic capacitor 1 is manufactured in a manufacturing process substantially the same as in the first embodiment. The difference above will be described below in detail.

Figure 17:
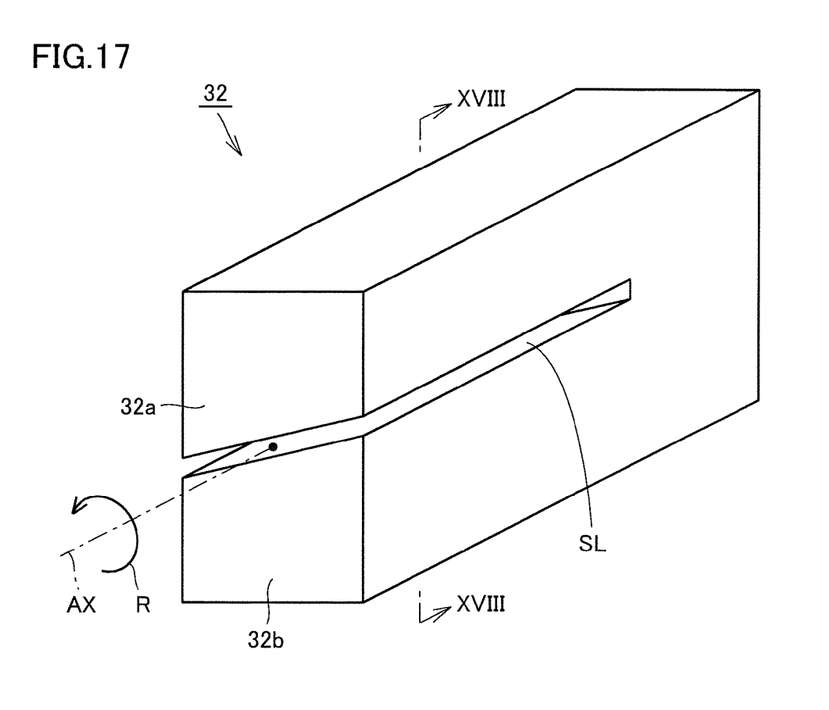
FIG. 17 is a perspective view schematically showing a first step in a method of manufacturing an electrolytic capacitor in a second embodiment of the present invention.
Figure 18:
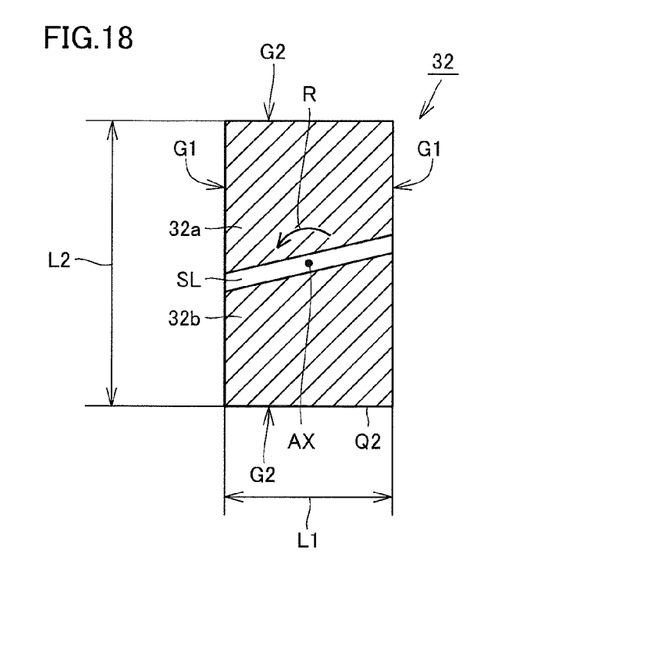
FIG. 18 is a schematic cross-sectional view along the line XVIII-XVIII in FIG. 17.
Figure 19:
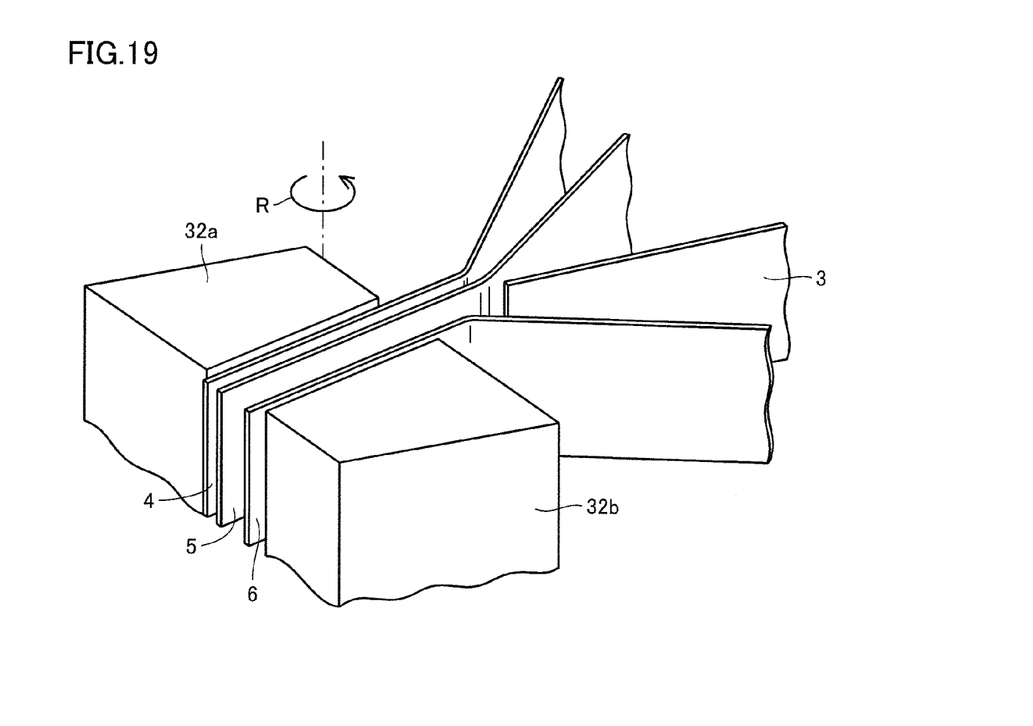
FIG. 19 is a perspective view schematically showing a second step in the method of manufacturing an electrolytic capacitor in the second embodiment of the present invention.
Figure 20:
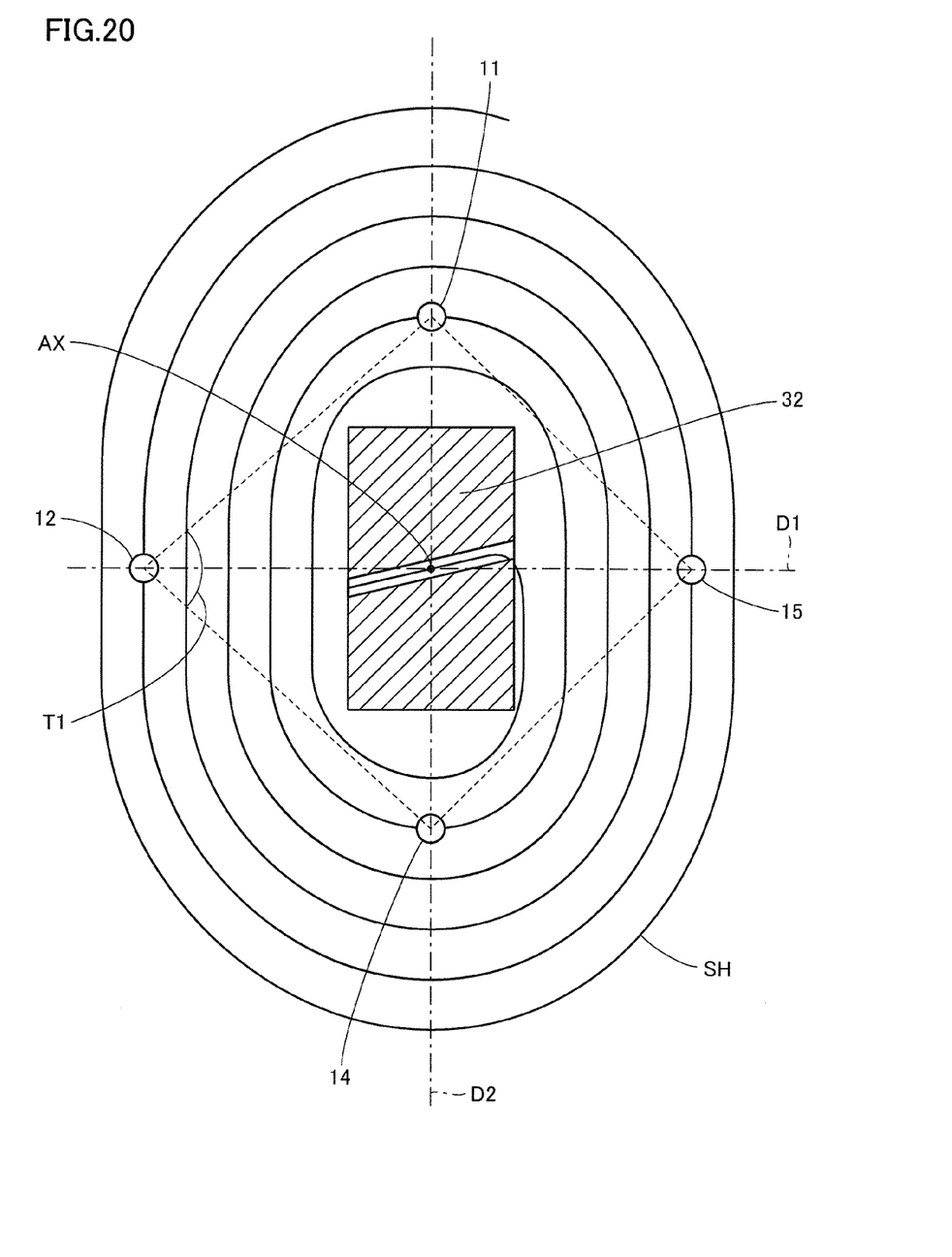
FIG. 20 is a cross-sectional view schematically showing a third step in the method of manufacturing an electrolytic capacitor in the second embodiment of the present invention.

Referring to FIGS. 17 to 19, a core 32 is prepared in the present embodiment. A one end portion of core 32 on axis AX (an end portion in lower left in FIG. 17) is divided into first and second portions 32a and 32b by slit SL. In addition, as shown in FIG. 18, a cross-section of core 32 perpendicular to axis AX has an outer perimeter corresponding to a rectangle Q2. Rectangle Q2 has an additional pair of straight line portions G2 (second straight line portion) in addition to the pair of straight line portions G1. A corner portion of rectangle Q2 is preferably beveled in order not to damage a foil to be wound around core 32. It is noted that rectangle Q2 herein is a shape defined regardless of presence of slit SL and a curved portion beveled as above. Winding (FIGS. 19 and 20) substantially the same as in the first embodiment (FIGS. 8 and 9) is performed with the use of core 32.

According to the present embodiment as well, functions and effects substantially the same as in the first embodiment can be obtained. In addition, unlike core 31 in the first embodiment, core 32 employed in the present embodiment has both of the pair of straight line portions G1 and the pair of straight line portions G2 (FIG. 18). Thus, displacement of a position of a terminal from a desired position can further be suppressed. The reason will be described below with reference to FIGS. 21 and 22. Since FIGS. 21 and 22 are conceptual diagrams for illustrating relationship of force between each terminal and a core, stack sheet SH (FIGS. 9 and 20) is not shown.

Figure 21:
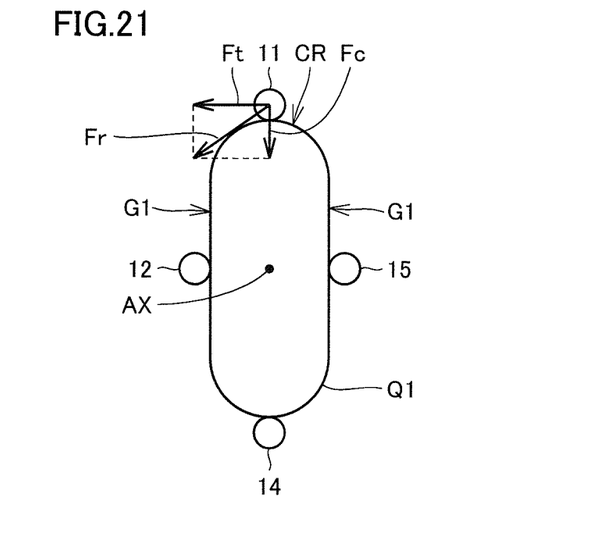
FIG. 21 is an illustrative diagram schematically showing how force is applied to an electrode lead in a case where a core having a racetrack-shaped cross-section is employed in a method of manufacturing an electrolytic capacitor.

Referring mainly to FIG. 21, in a case where anode foil 3, cathode foil 4, and sheets of separator paper 5 and 6 are wound around core 31 (FIG. 7), force toward axis AX of core 31 is applied to each of lead tab terminals 11, 12, 14, and 15. For example, force Fc toward axis AX is applied to first anode lead tab terminal 11. This force Fc is force Fc pressing first anode lead tab terminal 11 against core 31, and this force Fc alone does not seem to cause displacement of first anode lead tab terminal 11. Depending on tension variation in anode foil 3 or cathode foil 4, however, force along the outer perimeter of core 31 may be applied to each of lead tab terminals 11, 12, 14, and 15. For example, force Ft may be applied to first anode lead tab terminal 11 depending on tension variation in anode foil 3. Consequently, resultant force Fr of force Fc and force Ft is applied to first anode lead tab terminal 11. Here, since core 31 has the outer perimeter in racetrack shape Q1, it has a curve portion CR and slight position displacement of first anode lead tab terminal 11 located on a curved surface of core 31 corresponding to this curve portion CR may be caused by resultant force Fr.

Figure 22:
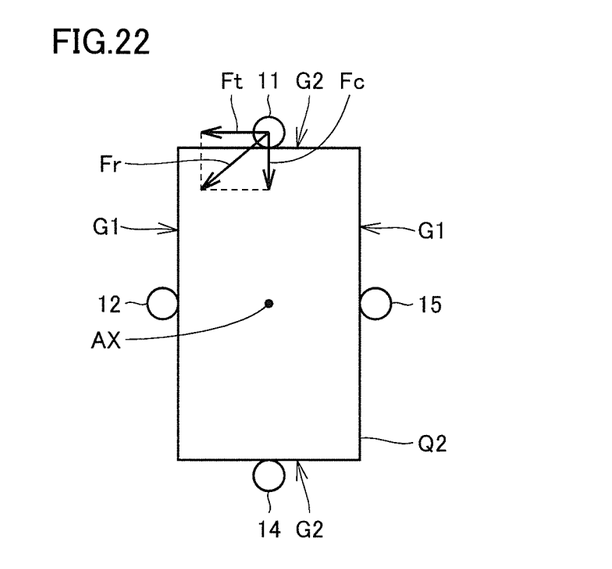
FIG. 22 is an illustrative diagram schematically showing how force is applied to an electrode lead in the method of manufacturing an electrolytic capacitor in the second embodiment of the present invention.

Referring to FIG. 22, in contrast, core 32 in the present embodiment has the outer perimeter in a shape of rectangle Q2 and hence it has the pair of straight line portions G2. First anode lead tab terminal 11 located on a flat surface of core 32 corresponding to this straight line portion G2 is stable even under resultant force Fr. Similarly, position displacement of each of three other lead tab terminals 12, 14 and 15 is less likely as they are arranged on three other sides of rectangle Q2, respectively. Therefore, according to the present embodiment, accuracy in arrangement of all of four lead tab terminals 11, 12, 14, and 15 is improved.

Referring again to FIG. 21, even in a case of using core 31, for the reasons the same as described above, accuracy in arrangement of second anode lead tab terminal 12 and second cathode lead tab terminal 15 can be improved by the presence of the pair of straight line portions G1. In addition, as a variation of core 31, in a case where second anode lead tab terminal 12 and second cathode lead tab terminal 15 are arranged on the pair of curve portions CR respectively and first anode lead tab terminal 11 and first cathode lead tab terminal 14 are arranged on the pair of straight line portions respectively, accuracy in arrangement of first anode lead tab terminal 11 and first cathode lead tab terminal 14 is improved. Comparing core 31 (FIG. 7) and the variation described above with each other, the former is preferred because core 31 can ensure a long length of the straight line portion.

Dimensions in one example of the present embodiment are as follows. Anode foil 3 has a thickness of 110 μm and a length of 130 mm. Cathode foil 4 has a thickness of 30 μm and a length of 150 mm. Each of sheets of separator paper 5 and 6 has a thickness of 30 μm and a length of 160 mm. A cross-section of core 32 has length L1=1.0 mm and length L2=1.8 mm. In addition, the cross-section of capacitor element 2 has length K1=6.5 mm and length K2=7.2 mm.

A result of verification of functions and effects of the present embodiment will now be described. Under the dimension conditions above, 300 electrolytic capacitors 1 were manufactured as Example of the present embodiment. Consequently, angle T1 (FIG. 3) of all samples was within the range of 90°±20°. In contrast, in a case representing Comparative Example where circular core 39 (FIGS. 13 to 15) was employed, in 15 samples of 300 samples, angle T1 (FIG. 3) was not within the range of 90°±20°. Namely, probability that four terminals are arranged in a manner substantially corresponding to four respective vertices of a square was higher in Example than Comparative Example.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of manufacturing an electrolytic capacitor, comprising the steps of:
   preparing a cathode foil which has one end;
   attaching first and second cathode lead terminals to said cathode foil, said first cathode lead terminal being arranged closer to said one end of said cathode foil than said second cathode lead terminal;
   preparing an anode foil which has one end;
   attaching first and second anode lead terminals to said anode foil, said first anode lead terminal being arranged closer to said one end of said anode foil than said second anode lead terminal;
   preparing a core which has an axis, said core having, in a cross-section perpendicular to said axis, a first length along a first straight line which passes through said axis and a second length along a second straight line which passes through said axis and is orthogonal to said first straight line, said first length being smaller than said second length; and
   winding said cathode foil and said anode foil together around said core from said one end of each of said cathode foil and said anode foil, said winding being performed such that, in said cross-section, said first straight line lies between said first cathode lead terminal and said first anode lead terminal and said second straight line lies between said second cathode lead terminal and said second anode lead terminal.

2. The method of manufacturing an electrolytic capacitor according to claim 1, wherein
   said cross-section of said core has at least any pair of a pair of first straight line portions and a pair of second straight line portions, said first straight line portions are opposed to each other along said first straight line and extend in parallel to said second straight line, and said second straight line portions are opposed to each other along said second straight line and extend in parallel to said first straight line.

3. The method of manufacturing an electrolytic capacitor according to claim 2, wherein
   said cross-section of said core has said pair of first straight line portions and said pair of second straight line portions.

4. The method of manufacturing an electrolytic capacitor according to claim 1, wherein
   said cross-section of said core has at least any pair of a pair of first curve portions and a pair of second curve portions, said first curve portions are opposed to each other along said second straight line and convex outward, and said second curve portions are opposed to each other along said first straight line and convex outward.

5. An electrolytic capacitor, comprising:
   a capacitor element which includes a cathode foil and an anode foil each of which has one end, said cathode foil and said anode foil being wound together around an axis from said one end of each of said cathode foil and said anode foil, said capacitor element having, in a cross-section perpendicular to said axis, a first length along a first straight line which passes through said axis and a second length along a second straight line which passes through said axis and is orthogonal to said first straight line, and said first length being smaller than said second length;
   first and second cathode lead terminals which are attached to said cathode foil, said first cathode lead terminal being arranged closer to said one end of said cathode foil than said second cathode lead terminal in a direction of extension of said cathode foil; and
   first and second anode lead terminals which are attached to said anode foil, said first anode lead terminal being arranged closer to said one end of said anode foil than said second anode lead terminal in a direction of extension of said anode foil, said first straight line lying between said first cathode lead terminal and said first anode lead terminal, and said second straight line lying between said second cathode lead terminal and said second anode lead terminal.

\* \* \* \* \*